(No Model.)

B. P. REMY.
ELECTRIC MOTOR.

No. 544,749. Patented Aug. 20, 1895.

Witnesses:
V. P. Houston
B. W. Remy

Inventor:
Benjamin Perry Remy

UNITED STATES PATENT OFFICE.

BENJAMIN PERRY REMY, OF PERU, INDIANA.

ELECTRIC MOTOR.

SPECIFICATION forming part of Letters Patent No. 544,749, dated August 20, 1895.

Application filed November 24, 1894. Serial No. 529,883. (No model.)

*To all whom it may concern:*

Be it known that I, BENJAMIN PERRY REMY, a citizen of the United States, residing at Peru, in the county of Miami and State of Indiana, have invented a new and useful Electric Motor, of which the following is a specification.

My invention relates to improvements in electric motors in which a revolving part composed of radial electromagnets operates in conjunction with a stationary hollow elliptical iron mass; and the objects of my invention are, first, to provide an efficient small motor suitable for running fans or small machinery to be operated by the high-frequency alternating current commercially used for incandescent lighting; second, to make the same as nearly noiseless as possible consistent with high speed; third, to provide a means of changing the direction of rotation and of regulating the speed without materially lowering the efficiency or causing disastrous sparking at commutator. I attain these objects by the mechanism illustrated in the accompanying drawings, in which—

Figure 1:
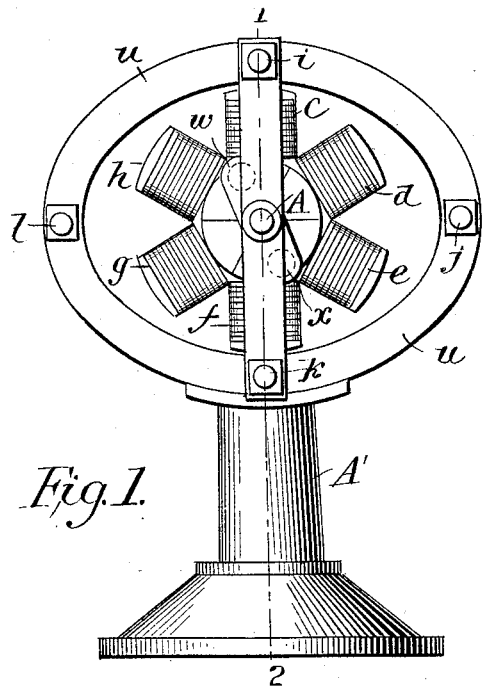
Figure 2:
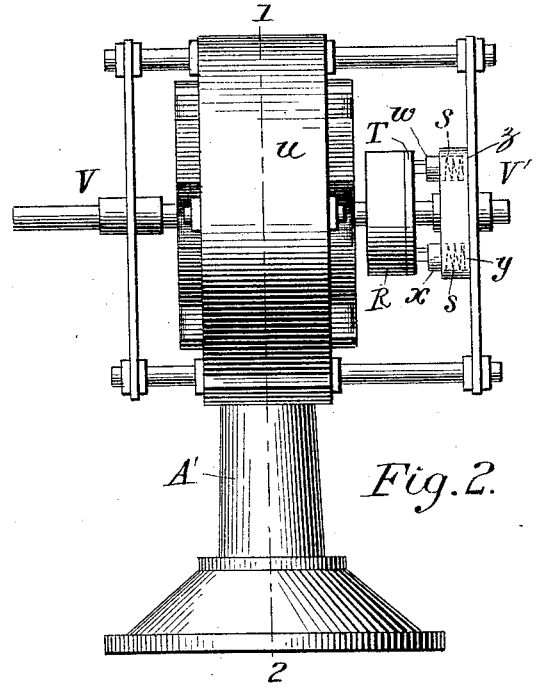
Figure 3:
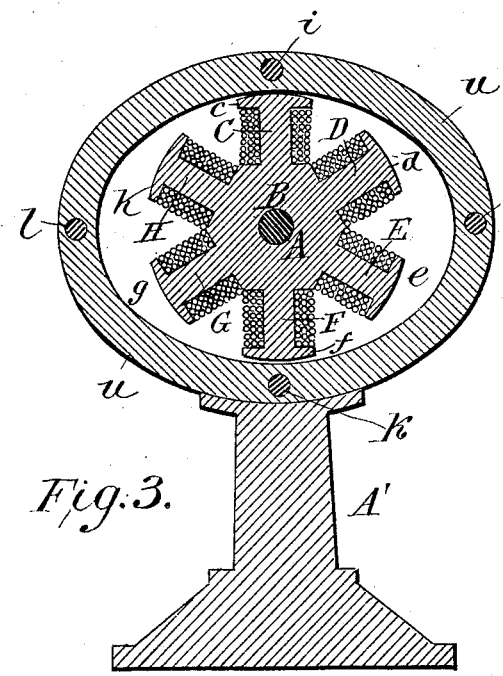

Figure 1 is a vertical view of the commutator end. Fig. 2 is a vertical view from a position at right angles to the shaft; Fig. 3, a vertical section on the line 1 2, Fig. 2; and Fig. 4, a vertical section on the line 1 2, Fig. 1.

Similar letters refer to similar parts throughout the several views.

The laminated body of the revolving part is composed of stampings of sheet-iron of shape B C D E F G H, Fig. 3. The laminæ are carried by a suitable shaft A, and are clamped in position by the nuts I and J, Fig. 4, with the brass washers K and L, having the same general shape as the laminæ interposed. The radial projections C, D, E, F, G, and H, Fig. 3, are each surrounded by a coil of insulated copper wire retained in position by the pole-pieces c, d, e, f, g, and h, Fig. 3, and the flanges M, N, O, and P, Fig. 4, on the brass washers K and L, Fig. 4. Diametrically-opposite coils are connected together in series in such a manner as to cause a magnetic flux to connect diametrically-opposite pole-pieces. The shaft also carries a six-part commutator R T, Fig. 4, having a copper segment corresponding to each coil fastened to a suitable fiber backing. The method of winding is similar to the open-coil winding, there being three separate circuits in the arrangement.

The two diametrically-opposite coils are connected together in series, as above described, and the remaining free ends are connected to the corresponding diametrically-opposite commutator-segments. The other two sets of diametrically-opposite coils and commutator-segments are arranged in the same manner.

U, Fig. 3, shows the shape and position of the laminæ of the stationary part U, Figs. 1 and 2. These laminæ are bolted together by bolts i, j, k, and l, Figs. 1 and 3, two of which, i and k, extend and support suitable bearings V and V', Figs. 2 and 4.

Figure 4:
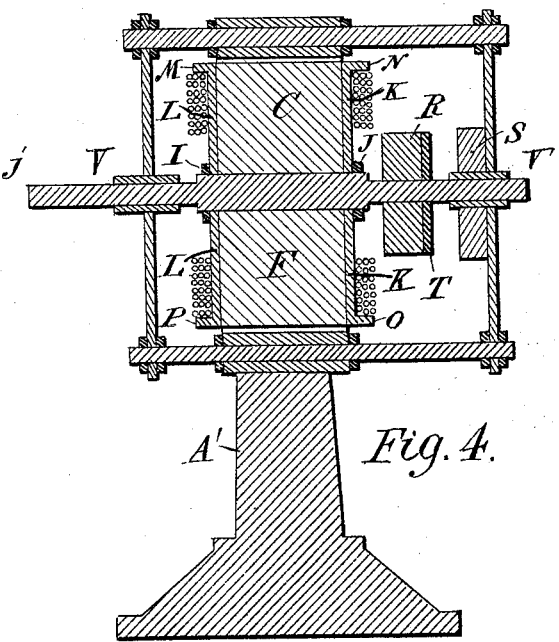

S, Figs. 2 and 4, is a brush-yoke, made of fiber or other suitable material, supporting the brush-holders and carbon brushes w and x, Fig. 2. The brushes are kept against the commutator by the spiral springs z and y, Fig. 2. The brushes are shown in the position of best action at w and x, Fig. 1. The two wires supplying the electric current are connected to the brush-holders w and x, Fig. 2.

The method of action of this motor is: The coils are supplied with the electric current by the brushes and commutator above described, when they reach the position h and e, Fig. 1. This causes poles h and e to attract the stationary iron U, which attraction pulls the pole h to position c, and e to position f. This action decreases the magnetic resistance, thereby increasing the magnetic flux, which generates the counter electromotive force in the surrounding coil. The speed regulation is obtained by shifting the yoke S, Figs. 1 and 2. By revolving the yoke from a perpendicular position to one nearly horizontal, the speed is varied from nothing to five thousand revolutions per minute. The direction of rotation is changed by shifting the brush-yoke past the perpendicular position. A', in Figs. 1, 2, 3, and 4, is a suitable pedestal.

I am aware that prior to my invention electric motors have been made with stationary coils attracting a revolving iron mass carrying brushes working in conjunction with a stationary commutator.

What I claim as my invention, and desire to secure by Letters Patent, is—

In an alternating current electric motor, the combination of radial electro-magnets adapted to rotate together, a commutator suitably connected to said electro-magnets, and a stationary iron part of an elliptical oval or similar shape, said stationary iron part generating no magnetism, but obtaining its magnetism wholly by induction from the revolving part.

B. PERRY REMY.

Witnesses:
V. P. HOUSTON,
B. M. REMY.